H. A. LAYCOCK.
REGULATOR.
APPLICATION FILED OCT. 7, 1912.
1,166,229.
Patented Dec. 28, 1915.
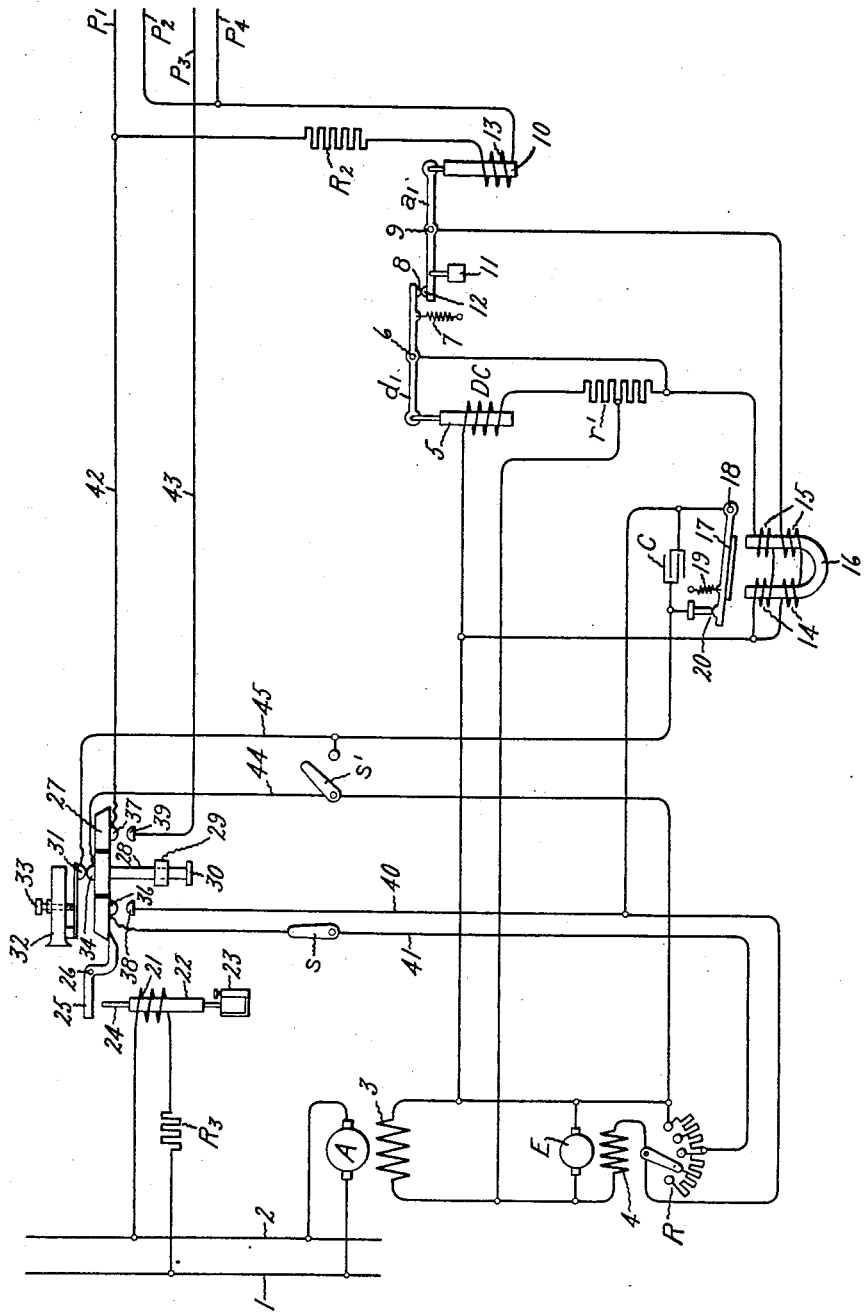
WITNESSES:
J. Earl Ryan.
J. Ellis Glen
INVENTOR:
HARRY A. LAYCOCK,
BY Albert G. Davis
HIS ATTORNEY.

UNITED STATES PATENT OFFICE.

HARRY A. LAYCOCK, OF SCHENECTADY, NEW YORK, ASSIGNOR TO GENERAL ELECTRIC COMPANY, A CORPORATION OF NEW YORK.

REGULATOR.

1,166,229.  Specification of Letters Patent.  Patented Dec. 28, 1915.

Application filed October 7, 1912. Serial No. 724,228.

*To all whom it may concern:*

Be it known that I, HARRY A. LAYCOCK, residing at Schenectady, in the county of Schenectady, State of New York, have invented certain new and useful Improvements in Regulators, of which the following is a specification.

My invention relates to voltage regulators of the resistance type. Such regulators automatically control the voltage of a generator by cutting resistance in and out of the field of the said generator or of an exciter for the same according to whether the voltage is too high or too low. Regulators of this kind may be so damaged that they will fail to cut in the regulating resistance and the voltage of the generator will then reach an abnormal value. This may arise, for instance, by a break in the pressure wires or transformer leads which are connected across the line at the point where the voltage is to be kept constant. These pressure wires extend back to the generator station and the current flowing in the same is utilized to actuate a suitable mechanism which will cut a suitable resistance in or out of the field of the generator or exciter according to whether the said current is high or low. Should the pressure wires be damaged by a break or other injury so that the current flowing therein is lowered or reduced to zero the effect would be that the resistance controlled by the regulator would be continuously short circuited and the voltage of the generator would rise correspondingly. It is obvious that considerable damage might ensue from an abnormal voltage thus produced.

The object of the present invention is to provide a means which will be brought into operation upon the attainment in any manner of a predetermined abnormal voltage by the generator to reduce the said voltage to normal.

My invention consists in providing means in addition to the ordinary regulating means which will be brought into operation upon the attainment of a predetermined abnormal voltage of the generator and which will insure a reduction of the generator voltage to a normal value. My invention comprises means for completely neutralizing the effect of the regulator and for inserting in the circuit of the exciter or generator field a body of resistance which will reduce the voltage of the said generator to a normal value. Together with my invention I have shown means for cutting out the set of pressure wires which is in circuit with the regulator and simultaneously substituting another set. This latter device contemplates the operation of the regulator as before the damage to the first set of pressure wires.

In my invention I prefer to utilize for the auxiliary resistance the same rheostat as that ordinarily controlled by the regulator. As the resistance ordinarily controlled by the regulator in the case of such regulators as those disclosed in Tirrill Patents #725,800 and 726,234 is so high that the permanent inclusion of the same in the field of the exciter or generator would be apt to cause a shut-down. I provide means for short circuiting a portion of the said rheostat resistance when my safety device is brought into operation.

I have shown my invention in connection with a regulator such as that lisclosed in Tirrill Patents #725,800 and #726,234. In such a regulator the pressure wires are included in the circuit containing a solenoid which acts in conjunction with other elements to short circuit a resistance in the exciter field circuit when the voltage of the generator is too low and to cut said resistance in when the voltage is too high. As applied to such a regulator my invention embodies means to cut the regulator out of circuit and to simultaneously short circuit a portion of the exciter field resistance when such an abnormal voltage occurs as might be occasioned by damage to the pressure wires of said regulator. The arrangement is such that after the damage on the pressure wires has been located and repaired the regulator may be readily reinserted in the circuit.

In conjunction with the above described structure I preferably provide means whereby, upon the occurrence of the aforesaid abnormal voltage the damaged pressure wires are replaced in the regulator circuit by another set. I also provide means whereby, instead of the regulator being cut out, it may be made to act as before the break but with the new pressure wires substituted for the old.

My invention will be more clearly understood by referring to the drawing which shows diagrammatically my invention embodied in a Tirrill regulator system.

In the drawing A is an alternating current generator which supplies current to mains 1, 2.

E is an exciter which supplies current to the field 3 of the generator A.

4 is the shunt field of the exciter E, and R is an adjustable resistance which is adapted to be connected in circuit therewith. The resistance R is adapted to be cut in or out of the circuit of the exciter field 4 by means of a regulator of the type disclosed in the Tirrill Patent #726,234 hereinbefore referred to. As shown diagrammatically in the drawing this regulator comprises a direct magnet lever $d_1$, and an alternating current magnet lever $a_1$, the former being actuated by the coil D, C, which acts upon the core 5. This coil is connected across the exciter mains and an adjustable resistance $r'$ may be included in the said circuit. Lever $d_1$ is fulcrumed at 6 and acts against a retractile spring 7. The end of said lever carries the contact 8. The alternating current lever $a_1$ is fulcrumed at 9 and carries at one end the core 10 and at the other the counter-weight 11 and the contact 12. The core 10 is adapted to be drawn downwardly a distance dependent upon the current flowing in coil 13 which is connected at the desired point across the mains leading from the generator A through pressure wires $P_1$ $P_2$. In the circuit of said coil may be included the resistance $R_2$. The contacts 8, 12, control a circuit which includes the coils 14, 15 of the relay magnet 16. This circuit is supplied with a suitable source of current, as by connecting it in shunt with the mains leading from the exciter. The relay magnet upon being energized is adapted to attract the armature 17 which is pivoted at 18 and which acts against the spring 19 to break contact at 20 and thus include the resistance R in the field of the exciter. In order to prevent sparking the condenser C is provided.

The coil 21 is connected across the mains 1, 2. A suitable resistance $R_3$ may be included so as to lessen the current flowing through said coil. The coil 21 acts upon the core 22 the lower end of which works within a dash pot 23. On the top of said core is a projecting pin 24. Immediately above and in the path of travel of said pin is mounted the lever 25 which is pivoted at 26 and held in the position shown by gravity. Normally supported by the end of said lever is the bar 27 of insulating material. To this bar is attached the rod 28 which engages with the guide 29 and to the lower end of which is attached an operating handle 30. Above the bar 27 is mounted the spring contact 31 which is attached to the block 32 and which may be regulated by the set-screw 33. The contact 31 engages with contact 34 when the bar 27 is in its uppermost position, i. e. when it is supported by the lever 25. On the lower face of the bar 27 are mounted contacts 36, 37 which are adapted to engage contacts 38, 39 when the bar 27 is released by the lever 25. Leading from the contacts 36, 38 are conductors 40, 41, the former of which is in series with the exciter field and the latter of which is connected to an intermediate resistance contact on the rheostat R. Connected to the contacts 37, 39 are conductors 42, 43, the former of which connects with pressure wire $P_1$ and the latter of which is connected to a pressure wire $P_2$. Connected to the contacts 31 and 34 are conductors 44, 45, the former of which is connected to the terminal corresponding to the minimum resistance of the rheostat R and the latter of which is connected to one of the relay contacts 20. Switches $s$, $s'$ are included in lead 41 and across leads 44, and 45, respectively.

Upon an abnormal voltage of a predetermined value occurring across the mains 1 and 2, the solenoid 21 will raise the core 22 and cause the projection 24 to abut against and lift the left-hand end of the lever 25. This will allow the bar 27 to drop thus separating the contacts 31, 34 and bringing together the contacts 36, 38 and 37, 39. With the switches $s$ and $s'$ in position shown in the drawing the effect of this will be to open the circuit between the rheostat R and the short-circuiting contacts 20 of the regulator and at the same time to include continuously in the circuit of the field 4 a predetermined portion of the resistance of said rheostat. This resistance will have the effect of reducing the voltage of the main generator to normal but will not be sufficient to cause a shut-down. When the damage to the pressure wires $P^1$, $P^2$ has been located and fixed the regulator can be put back in circuit by raising the bar 27 by means of the handle 30 thus bringing together the contacts 31, 34 and separating the contacts 36, 38 and 37, 39.

Should it be desired to allow the regulator to continue to act after the damage to the pressure wires $P^1$, $P^2$ this can be done by closing the switch $s'$. The regulator will then continue to act with the pressure wires $P^3$, $P^4$ substituted for wires $P^1$ $P^2$ by reason of the engagement of the contact 37 with the contact 39. By opening the switch S the entire field resistance may be availed of and the regulator will operate to all intents and purposes as before the damage to the pressure wires.

Various modifications of the structure described will suggest themselves to those skilled in the art and are to be considered as coming within the scope of my invention as set forth in the following claim.

What I claim as new and desire to secure by Letters Patent of the United States is:—

The combination of a generator, an excitation system for said generator, a resistance in said excitation system, a voltage regulator arranged to short-circuit said resistance at intervals in order to control its effective value, and means operative upon an abnormal increase in the voltage delivered by said generator to break the circuit between the said regulator and said resistance and to short-circuit a portion of said resistance, so that the generator voltage is maintained at approximately its normal value.

In witness whereof, I have hereunto set my hand this 4th day of October, 1912.

HARRY A. LAYCOCK.

Witnesses:
BENJAMIN B. HULL,
HELEN ORFORD.

Copies of this patent may be obtained for five cents each, by addressing the "Commissioner of Patents, Washington, D. C."